United States Patent [19]

Tiilikainen

[11] Patent Number: 5,710,810
[45] Date of Patent: Jan. 20, 1998

[54] QUICK DIALING IN A MOBILE PHONE

[75] Inventor: Ilkka Tiilikainen, Tampere, Finland

[73] Assignee: Nokia Mobile Phones Limited, Salo, Finland

[21] Appl. No.: 582,133

[22] Filed: Jan. 2, 1996

[30] Foreign Application Priority Data

Jan. 5, 1995 [FI] Finland ................... 950079

[51] Int. Cl.$^6$ ...................... H04M 1/00; H04M 1/56
[52] U.S. Cl. ................. 379/355; 379/354; 379/93.19
[58] Field of Search ........................ 379/354, 355, 379/356, 357, 96, 110, 93.17, 93.19, 93.23

[56] References Cited

U.S. PATENT DOCUMENTS

| | | | |
|---|---|---|---|
| 4,885,580 | 12/1989 | Noto et al. | 379/354 X |
| 5,267,308 | 11/1993 | Jokinen et al. | 379/354 |
| 5,283,818 | 2/1994 | Klausner et al. | 379/354 X |
| 5,390,236 | 2/1995 | Klausner et al. | 379/354 X |
| 5,422,656 | 6/1995 | Allard et al. | 345/173 |
| 5,454,035 | 9/1995 | Oba et al. | 379/354 |
| 5,455,857 | 10/1995 | McGuire | 379/354 X |
| 5,457,738 | 10/1995 | Sylvan | 379/354 X |
| 5,483,352 | 1/1996 | Fukuyama et al. | 379/355 X |
| 5,522,089 | 5/1996 | Kikinis et al. | 379/96 X |
| 5,526,411 | 6/1996 | Krieter | 379/110 |
| 5,561,705 | 10/1996 | Allard et al. | 379/355 X |

FOREIGN PATENT DOCUMENTS

| | | |
|---|---|---|
| 0570116 A1 | 11/1993 | European Pat. Off. . |
| 0664504 A2 | 7/1995 | European Pat. Off. . |
| 62-294352 | 12/1987 | Japan ................ 379/354 |

OTHER PUBLICATIONS

David Scott, "Touch-screen Communicator", Popular Science, vol. 222, No. 4, Apr. 1983, p. 103.

Hawkins, "Electronics Newsfront: No–dial phone", Popular Science, Jul. 1989, p. 30.

"Canon: Navigator Desktop Office", Canon Advertising Brochure, 1990 month not known.

"Desktop Dialer", Popular Science, Nov. 1991, p. 19.

"Sharp Wizard", Advertisement, Popular Science, Jan. 1995, p. 14.

"Pen–Based Automated Interpersonal Communication System", IBM Technical Disclosure Bulletin, vol. 38, No. 03, Mar. 1995, pp. 299–300.

Primary Examiner—Krista Zele
Assistant Examiner—Devendra T. Kumar
Attorney, Agent, or Firm—Perman & Green

[57] ABSTRACT

Telephone numbers along with alphanumerical identifications representing them are stored in a memory of a mobile phone. The number is selected with quick dialing so that the user first scrolls the identification corresponding to the required number on the display (11), after which the call is initiated by pressing the activation key. In the method of this invention the display is a touch-sensitive display, and a field (24) representing an identification on the display is divided into two or more sections (25, 26, 27) each of which corresponds to a different telephone number, e.g. to work (21), home (22) or to mobile phone (23). The required number is selected by pressing the column corresponding to the required section.

15 Claims, 1 Drawing Sheet

QUICK DIALING IN A MOBILE PHONE

BACKGROUND OF THE INVENTION

1. Field of the Invention

This invention relates to a quick-dialing method in which a telephone number is dialed in a simple and effective way in a mobile phone. The invention also relates to a mobile communicator that applies this dialing method. In this connection the term 'mobile phone' is understood in the widest meaning, i.e. it can refer to a mobile phone, such as a NMT or GSM phone, or some other portable Personal Communicator, for instance a pocket-size phone, that uses quick dialing. Likewise, the term 'telephone number' must be understood in a wider sense, also referring to a subscriber number of a terminal in public switched telephone network, an extension number at a private branch exchange, the number of another mobile phone or some other corresponding number.

2. Background Art

To begin with we look as an example at existing mobile phones the user interface of which may correspond to the one shown in FIG. 1. Mobile phone 10 is equipped with an alphanumerical display 11, feature keys 13, and digit/character keys 14 and a scrolling key 12. A device of this type is equipped with a microprocessor and memory in which various parameters related to its use can be stored with keys 12, 13, and 14. From the user's point of view it is practical that also telephone numbers can be stored in the memory. Depending on the mobile phone, the number of memory locations may amount to 100 or even more, and in addition to the telephone number also a name or other alphanumeric identification relating to the number can he stored in those locations. When the user would like to make a call to a number previously stored, he/she will access the number or the related identification on the display by using the keys 12, 13, and 14 in a suitable sequence. After checking the number or the identification the user can initiate the call by pressing a pre-defined feature key 13. The required number can be brought to the display by using the address of the memory location or even more easily by first selecting e.g. the first letter of a name and then scrolling the names that start with this letter on the display. Naturally, the contents of the memory can also be scrolled according to the sequential order of the memory location order with the scrolling key 12. This feature, the so-called quick dialing method is a factor enhancing user-friendliness but also means improved safety, especially if the phone is used while driving a car.

The operating pattern of quick dialing described above is quite logical and usable in most cases. However, if the same person has several alternative telephone numbers which the mobile phone user wants to store in the memory of the phone, the user must consequently make sure that the correct number option is selected beside checking the name. In this case it may concern a person's telephone number to work, home or a mobile phone, etc. Scrolling will take more time and become slower, and at the same time, the risk of dialing a wrong number increases.

SUMMARY OF THE INVENTION

The object of this invention is to find a solution capable of correcting the above mentioned shortcomings and disadvantages of prior dialing methods. This is implemented by a method for quickly initiating a telecommunication connection from a communication apparatus in which method telephone numbers and corresponding identifications are stored in the memory of the communication apparatus prior to making a call and where the number to be called is selected with a quick dialing method wherein the user first searches an identification on a display corresponding to the required stored number by using keys such that thereafter a call to the selected number is initiated by a single touching of a predetermined area of the display. This means that the same person has several telephone numbers assigned to the same identification of which the required number is selected by pressing the section or column of the touch-sensitive display that corresponds to the desired number.

A phone applying the method introduced in this invention a display for displaying information, a plurality of keys for entering information and a memory unit for storing telephone numbers and corresponding identifications, at least one of the keys being arranged to produce representatives of the identifications to the display when actuated. The display may be a touch-sensitive display with a plurality of equally selectable touch-sensitive sub-areas corresponding to the telephone numbers associated with the identification shown on the display. In a phone according to the invention the touch-sensitive display can be implemented with some method already known per se, e.g. an inductive or capacitive display.

This invention can be well applied to mobile phones, for instance to NMT, GSM, JDC, PCN, DAMPS or other equivalent mobile phones.

BRIEF DESCRIPTION OF THE DRAWINGS

Other preferred embodiments of this invention have been presented in dependent claims. In the following, the invention is described in further detail with reference to the enclosed drawings where

Figure 1:
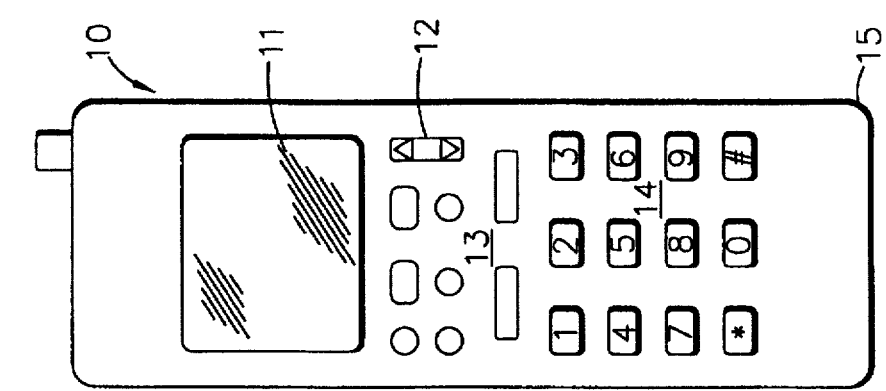
FIG. 1 illustrates the essential parts with respect to the invention of a mobile phone, even if previously known per se.

A more detailed description of the invention is given in the following with the help of examples, and for simplicity the starting point is considered to be the NMT phone already presented in FIG. 1 whereby a simplified diagram of the parts of the Nokia 101 phone (Nokia Mobile Phones, Finland) that are essential to this description is shown in FIG. 1. The user controls the operation of the device with button or key groups 12, 13, and 14. The device provides information to the user on the display 11. In particular the user can select the required numbers to be shown on the display 11 for quick dialing with a specific feature key. In this case the numbers must have been stored with some previously known method, as mentioned before. A name or some alphanumerical identification is preferably combined with the phone number, because it is easier for the user to remember a name, for instance.

Figure 2:
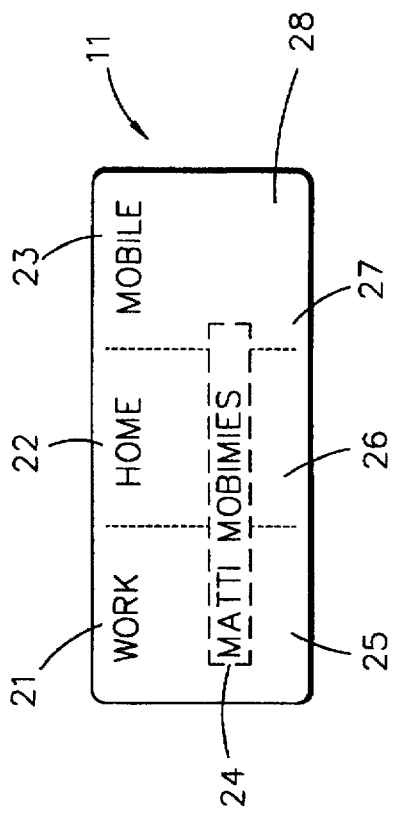
FIG. 2 shows the touch-sensitive display of the communicator that according to this invention has been divided into sections or columns, which is in the drawing indicated by vertical dotted lines whereas the boxes marked with dotted lines show the data fields
Figure 3:
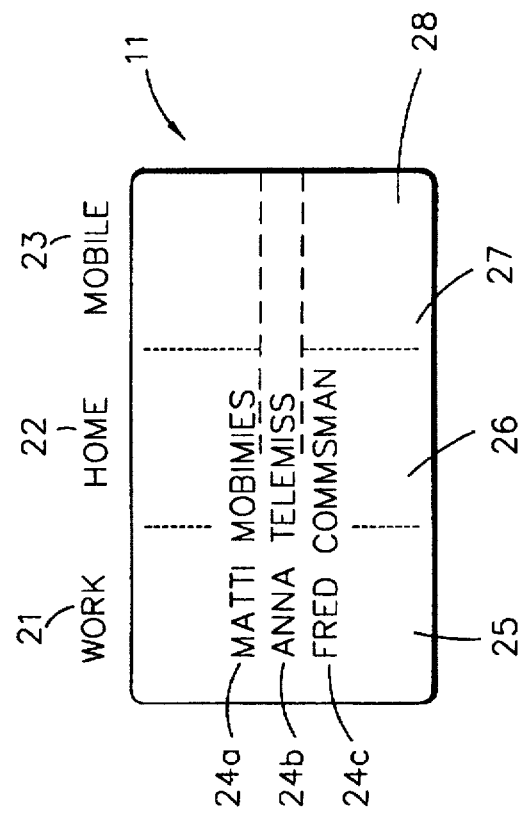
FIG. 3 illustrates the touch-sensitive display in a manner similar to that of FIG. 2, but in this embodiment, however, the display shows several identifications at the same time.

In accordance with the invention several numbers related to the same identification are stored to the phone's memory which in the examples given in FIG. 2 and 3 correspond to headers 'work' 21, 'home' 22 and 'mobile phone' 23. Naturally, the user does not have to adhere to this division, but can store for instance telephone numbers to summer cottages under a certain header, if desired, so that e.g. some identifications under the header 'mobile' would correspond to a mobile phone number whereas some identifications under the same header would refer to a telephone number to a summer cottage.

FIG. 2 illustrates how the display 11 is divided into sections, i.e. columns 25, 26, and 27, that have corresponding headers 21, 22, and 23. The headers can be arranged either on the display or naturally also outside the display area (in FIG. 3, reference numbers 21, 22, and 23). In case the headers are shown on the display, a symbol can be displayed at the same time, indicating to the user that this mode enables quick dialing.

When the required number has been brought to the field 24 of the display 28 with the scrolling key 12, the user can select the required number by pressing the corresponding column 25, 26, or 27. The selection can be made by pressing with a finger or e.g. with a pen whereby the phone immediately makes a call to the chosen number. Alternatively, the selection can be thought to be activated by double-pressing, i.e. pressing the required column quickly two subsequent times.

According to the size of the field 28 of the display 11 at the disposal it is possible to bring several identifications 24a, 24b, and 24c simultaneously to the display with the scrolling key 12, as shown in FIG. 3. In this case there are two methods of selecting the required number. Firstly, the required number can be scrolled with the scrolling key 12 to a specific row, e.g. to the uppermost field 24a whereby the selection is made by pressing the column under the required header 21–23. In this case the area of the whole column is available from the display's uppermost edge to the lowest edge. Another possibility is to divide the display into several identification lines, whereby selection is made by pressing the required column 25–27 at the required line 24a–24c. The selection method mentioned last requires a display large enough to enable using a finger for making the choice. With a pen or with some other rather sharp pointed object it is naturally possible to indicate the selection unambiguously even at a smaller junction point of a line and a column.

The quick dialing function can be made clearer with a display arranged according to the invention. As the display is divided into selection columns, no separate corresponding, large enough push buttons or keys are needed, which naturally saves the area of the phone's front panel. The method specified in the invention also provides the user with a clear quick dialing method since several different phone numbers can be stored under the same identification, depending on the number of columns on the display. When all numbers are stored according to the same principle, quick dialing will become faster. Naturally, memory space required for storing the quick dialing numbers can be saved as several phone numbers can be stored under the same identification and there is no need to reserve memory space for storing a separate identification for each number, too. As the number of telephone numbers in the memory increases, also the savings can be considerable.

In a preferred embodiment of the invention, the user is also given the option of more conventional quick dialing. This means that the keys 12–14 are used to first bring a list of available quick dialing names and/or numbers to the display and then to scroll a selection indicator (for example, a certain character next to the list) up and down the list, until the intended recipient is found. There may be as many dedicated selection keys as there are possible telephone numbers associated with one name, or a separate column scrolling key may be used to scroll through the work, home, mobile and other telephone numbers of the recipient. When the selection corresponds to the required number, pressing the off-hook-key or other functionally similar key activates the calling function. This feature is useful if the user finds the touch-sensitive display inconvenient for some reason.

When required, the display 11 can be made large enough to accommodate both the display and all the keys 12–14 shown in the figure which would in this case correspond to the area indicated with number 15 in the figure. This arrangement does not as such affect the selection of identifications and columns.

Naturally a person skilled in the art will on the basis of the above description find many applications and modifications to the method and device applying this invention.

As a consequence, the arrangement of the display and keys shown in FIG. 1 is not restrictive, but the display could as well be placed to another location on the front panel of the device. Further, the size of the display does not limit the use of the invention, since the same idea can be applied to display units where 1 to n fields 24 are shown whereby n is specified according to the size and resolution of the display.

The principle of this invention can be applied to mobile phones and other corresponding devices in which there is a need for simplifying the quick dialing function.

I claim:

1. A method for quickly initiating a telecommunication connection from a communication apparatus (10), in which method telephone numbers and corresponding identifications are stored in a memory of said communication apparatus (10) prior to making a call and where the number to be called is selected with a quick dialing method wherein the user first searches an identification on a display (11) corresponding to the required stored number by using keys (11, 12, 13), characterized in that thereafter a call to the selected number is initiated by a single touching of a predetermined area (25, 26, 27) of said display; and in that at least two identifications (24a, 24b, 24c) are shown on the display at the same time whereby the required number is selected by first scrolling the required identification onto a pre-defined line (24b) of said display and by then touching a column (21, 22, 23) corresponding to a required section (25, 26, 27).

2. A method for quickly initiating a telecommunication connection from a communication apparatus (10), in which method telephone numbers and corresponding identifications are stored in a memory of said communication apparatus (10) prior to making a call and where the number to be called is selected with a quick dialing method wherein the user first searches an identification on a display (11) corresponding to the required stored number by using keys (11, 12, 13), characterized in that thereafter a call to the selected number is initiated by a single touching of a predetermined area (25, 26, 27) of said display; and in that at least one of said identifications (24) has at least two alternative telephone numbers associated thereto and stored in the memory of said communication apparatus (10), wherein when said at least one identification (24) is displayed on said display (11) a different and equally selectable sub-area (25, 26, 27) of said display corresponds to each one of said at least two alternative telephone numbers, and the user selects the number to be called by touching the corresponding sub-area of said display.

3. A method according to claim 2, characterized in that at least two identifications (24a, 24b, 24c) are shown on the display at the same time whereby the required number is selected by touching a column (21, 22, 23) corresponding to a required section (25, 26, 27) on a line of the selected identification (24a, 24b, 24c).

4. A method according to claim 2, characterized in that the identification is a person's name or an alphanumerical string standing for it.

5. A method according to claim 2, characterized in that marking designating sub-areas (21, 22, 23) are indicated as fields of the display.

6. A method according to any of the preceding claims, characterized in that the user initiates a call to the selected number by touching a sub-area corresponding to the selected number at least two subsequent times.

7. A method according to claim 2, characterized in that the keys are pressed with a pen.

8. A method according to claim 2, characterized in that the keys are pressed with a finger.

9. A method according to claim 2, characterized in that as a functional alternative of the selection of the required telephone number by touching a sub-area of said display (11 ), the user selects the required telephone number by a key command.

10. A personal communicator comprising a display (11) for displaying information, a plurality of keys (12, 13, 14) for entering information and memory means for storing telephone numbers and corresponding identifications, at least one of said keys being arranged to produce representatives of said identifications to said display when actuated, characterized in that said display (11 ) is a touch-sensitive display with a plurality of equally selectable touch-sensitive sub-areas (25, 26, 27) corresponding to the telephone numbers associated with the identification (24) shown on said display (11); and in that the touching of a predetermined selectable sub-area of said touch-sensitive sub-areas (25, 26, 27) of said display (28) will initiate a call to the corresponding telephone number.

11. A personal communicator according to claim 10, characterized in that at least some of said keys (12, 13, 14) are included in the area of said touch-sensitive display (28).

12. A personal communicator according to claim 10, characterized in that said sub-areas are arranged as columns (25, 26, 27) of said touch-sensitive display (28).

13. A personal communicator according to claim 10, characterized in that sub-areas are arranged as intersections of columns (25, 26, 27) and lines (24a, 24b, 24c) of said display (28).

14. A personal communicator according to claim 10, characterized in that it comprises markings outside said display (28) indicating said sub-areas.

15. A personal communicator according to claim 10, characterized in that it comprises markings in said display (28) indicating said sub-areas.

\* \* \* \* \*